Oct. 19, 1965 L. M. LUKE 3,213,298
DIFFERENTIAL INTEGRATOR, SAMPLER AND COMPARATOR SYSTEM
Filed Sept. 7, 1961 2 Sheets-Sheet 1

*INVENTOR.*
*LLOYD M. LUKE*
BY
*T. L. Styner*
ATTORNEY

United States Patent Office 3,213,298
Patented Oct. 19, 1965

3,213,298
DIFFERENTIAL INTEGRATOR, SAMPLER AND
COMPARATOR SYSTEM
Lloyd M. Luke, Rochester, N.Y., assignor to General
Dynamics Corporation, Rochester, N.Y., a corporation
of Delaware
Filed Sept. 7, 1961, Ser. No. 136,642
6 Claims. (Cl. 307—88.5)

This invention relates to system for comparing the amplitudes of two randomly varying signals and is particularly directed to systems for comparing randomly varying signals which have been integrated and averaged over a finite period of time.

The principal object of this invention is to provide improved means whereby two randomly varying signal voltages are compared and a distinct voltage pulse of one polarity or the other is produced which is indicative of the relative amplitudes of the average voltage values of the two signal voltages. The binary voltages of a telegraphic message are exemplary of the kind of voltage which may be compared in the circuits of this invention.

The object of this invention is attained in a system embodying the invention which includes circuits for individually integrating over a measured interval of time the two unknown random voltages in separate integrating circuits each of these circuits includes means for storing energy proportional to the average value of one of the voltages. Condenser storage is suitable. Impedance means, such as the primary winding of a transformer, is coupled in the discharge circuits of the two integrating circuits to establish opposing electric fields in the impedance means. Switches are provided for simultaneously discharging the integrating circuit through said impedance means and an output circuit is coupled to said impedance means for producing a voltage pulse of the amplitude and polarity indicative of the relative amplitudes of the integrated voltages.

Other objects and features of this invention will become apparent to those skilled in the art by referring to the preferred embodiments described in the following specification and shown in the accompanying drawings, in which.

Figure 1:
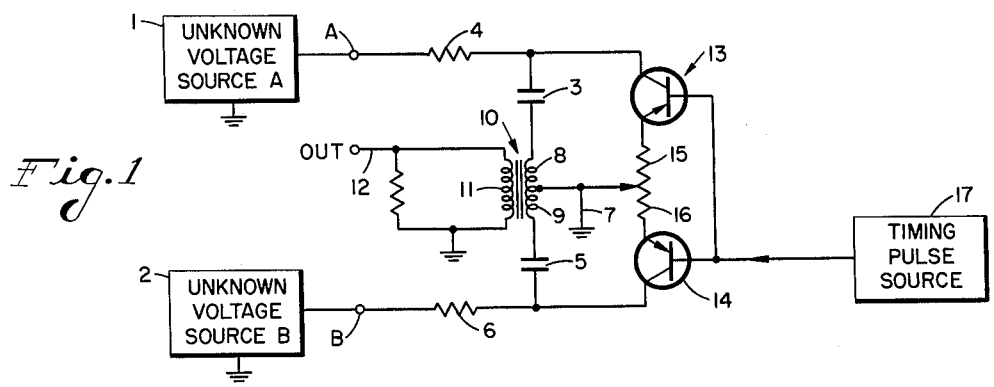
FIG. 1 is a schematic diagram of a system according to an embodiment of this invention.
Figure 2:
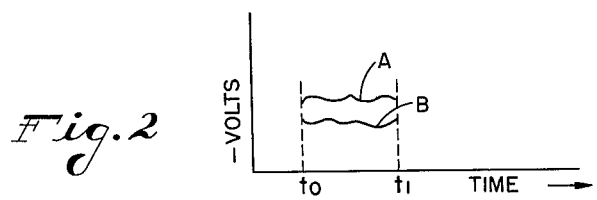
FIG. 2 shows typical waveforms of voltages to be compared in the system of FIG. 1.

Referring to FIG. 1, unknown voltage sources 1 and 2 represent sources of voltages which may vary randomly with time, as shown, respectively, at A and B in FIG. 2. It is desired that the average amplitude of the voltage at A be compared to the average amplitude of the voltage at B, the average to be taken over the finite period of time, $t_0$ to $t_1$. Where it is necessary to distinguish between "mark" and "space" voltages of a telegraphic system, for example, the time period $t_0$ to $t_1$ would preferably be equal to the duration of one code element. For reliable operation, it is desirable to produce an unequivocal positive or negative voltage depending upon whether or not the average amplitude of the voltage at A exceeds the average amplitude of the voltage at B, notwithstanding that these amplitudes may vary randomly.

In FIG. 1, voltage A is applied to storage condenser 3 through the charging resistor 4. Voltage B is applied to storage condenser 5 through charging resistor 6. These condensers 3 and 5 and resistors 4 and 6 provide RC time constant or integrating circuits which are completed to the ground connection 7 through the two halves 8 and 9 of the primary winding of transformer 10. Where the time constant of the RC circuits including condenser 3 and resistor 4 and including condenser 5 and resistor 6 are long compared to the time period $t_0$ to $t_1$, storage condensers 3 and 5 charge to steady voltage levels equal, respectively, to the average amplitudes of voltages A and B.

At the end of the integrating time period, $t_0$ to $t_1$, condensers 3 and 5 are suddenly and simultaneously discharged. Since the discharge current flows in opposite directions through turns 8 and 9 of the primary winding, opposing fields are established in the primary winding. If these opposing fields are equal, no voltage appears across the secondary winding 11 of transformer 10 and no voltage appears at the output terminal 12. If, however, condenser 3 is charged to a higher voltage than condenser 5, a positive pulse will appear at output terminal 12. If, however, condenser 5 is charged to a higher voltage than condenser 3, a negative voltage pulse will appear at output terminal 12. In FIG. 1, one side of the output circuit 12 is referred to ground.

Switch means for simultaneously discharging condensers 3 and 5 is preferably of the solid state type because of its electrical and mechanical advantages over electromechanical switches. The switch means shown in FIG. 1 comprise transistor 13 and transistor 14. The particular transistors shown are of the P-N-P type with the emitter-collector circuits of each connected, respectively, across condensers 3 and 5. The discharge circuits also include resistances 15 and 16 of a balancing potentiometer, the sliding contact of which is grounded and is connected to the center tap of winding 8-9. The transistors normally stand nonconducting with emitter-to-collector resistances very high, of the order of several megohms. This transistor resistance can be reduced to near zero by pulsing the base electrodes of the transistors. Where the transistors are of the P-N-P type, the pulses would be negative-going. The controlling base electrodes are connected in parallel to the timing pulse source 17 so that the two bases are simultaneously driven to the conducting state. Timing pulse source 17 may be operated manually, or, as preferred, may comprise a continuously running pulse generator which is synchronized with the unknown voltage sources A and B to accurately and repetitively measure the integrating time period, $t_0$ to $t_1$.

In operation, voltages A and B from sources 1 and 2 are applied at time $t_0$ to their respective integrating circuits 3-4 and 5-6, with the discharge circuit open. At time $t_1$, a timing pulse from source 17 is simultaneously applied to the base control electrode of transistors 15 and 14 to discharge the two storage condensers through windings 8 and 9, respectively. A voltage then appears at output terminal 12 depending upon the relative amplitudes of the stored voltages, the polarity of the output pulse indicating which voltage (the voltage at 3 or the voltage at 5) is the higher.

Figure 3:
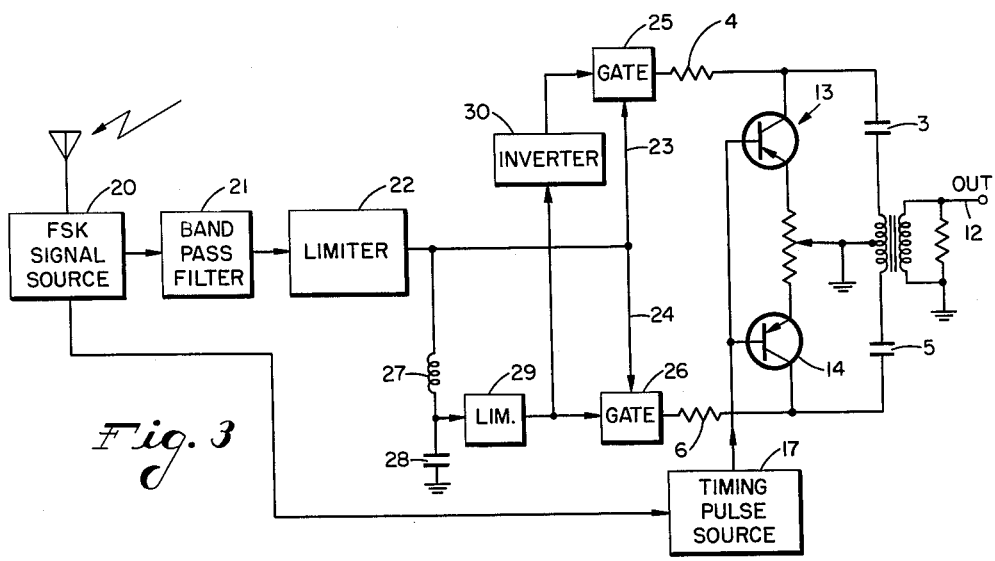
FIG. 3 is a schematic diagram of a telegraphic receiver system embodying the invention.

The integrating and sampling circuits of FIG. 1 are admirably adapted for identifying and reading out the "mark" and "space" voltages of a telegraph signal. As shown in FIG. 3, the received signal may be of the frequency shift keyed type (FSK) of a radio link subject to the usual spurious voltages and fadings of a radio link. At 20 is shown the equipment for receiving the FSK signal. The FSK signal is then passed through the bandpass filter 21 with a center frequency between the frequency of the expected "mark" and "space" frequencies. After limiting, in limiter 22, the FSK signal passes in parallel through terminals 23 and 24 of gates 25 and 26 to integrating circuits 3-4 and 5-6. Phase shifting coil 27 and condenser 28 and limiter 29 and inverter 30 are for the purpose of providing control signals to gates 25 and 26. Coil 27 and condenser 28 form a series resonant circuit tuned to the mean frequency of the expected FSK signal, and cause the phase of output from limiter 29 to vary with respect to the phase of the signal output from limiter 22 as the frequency of the incoming signal from 20 varies. Gates 25 and 26 are arranged so that the widths of their output pulses are proportional to the phase difference between the outputs of limiters 22 and 29. Thus if the signal frequency is above the resonant frequency of tuned circuits 27 and 28 over the interval $t_0$ to $t_1$, one of the capacitors, say 3, will accumulate a larger charge than the other capacitor 5 and the direction and magnitude of the difference will be indicated by the output pulse at 12 when the timing pulse source causes the capacitors to discharge.

Figure 4:
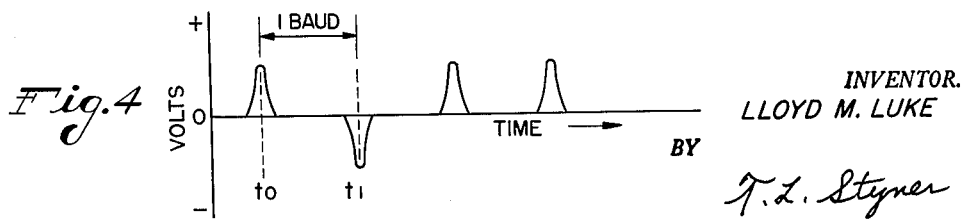
FIG. 4 shows waveforms appearing at the output terminal of the system of FIG. 3.

When telegraphic signals are to be received, it is preferred that timing pulse source 17 be synchronized with the transmitter to produce a timing pulse simultaneously at the base electrodes of the switching transistors every baud period. Signal pulse voltages, often of randomly varying amplitudes and widths, appear, respectively, at the integrating circuits 3–4 and 5–6; and at the end of the baud period, the timing pulse source discharges the storage condensers to produce a sharp positive or negative pulse, of the type shown in FIG. 4, at the output 12. The output pulses are well adapted to operate telegraph receiving and recording equipment. Thus, the ambiguities due to the random amplitudes of the voltages at A and B are effectively eliminated.

Figure 5:
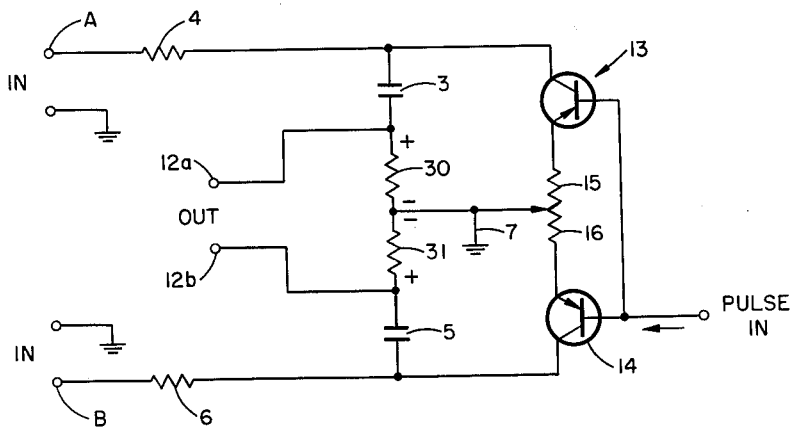
FIGS. 5 and 6 are, respectively, diagrams of other circuits which embody the invention.

Instead of the inductive load impedance 8–9 of FIG. 1, a resistive load may, if desired, be employed. As shown in FIG. 5, resistances 30 and 31 are respectively coupled between the storage condensers 3 and 5 and ground. When the switching devices 13 and 14 are simultaneously closed by a switching pulse, the discharge current through the resistors 30 and 31 produce opposing electrical potentials across the resistors 30 and 31. The output circuit 12 across the outer ends of resistors 30 and 31 will be zero if the integrated signals stored in the condensers are equal. If the charge stored in condenser 3 is larger than the energy stored in condenser 5, the voltage at output terminal 12a will be positive with respect to terminal 12b. A pulse of reverse polarity will, of course, attain if the energy stored in condenser 5 is greater than the energy stored in condenser 3.

Figure 6:
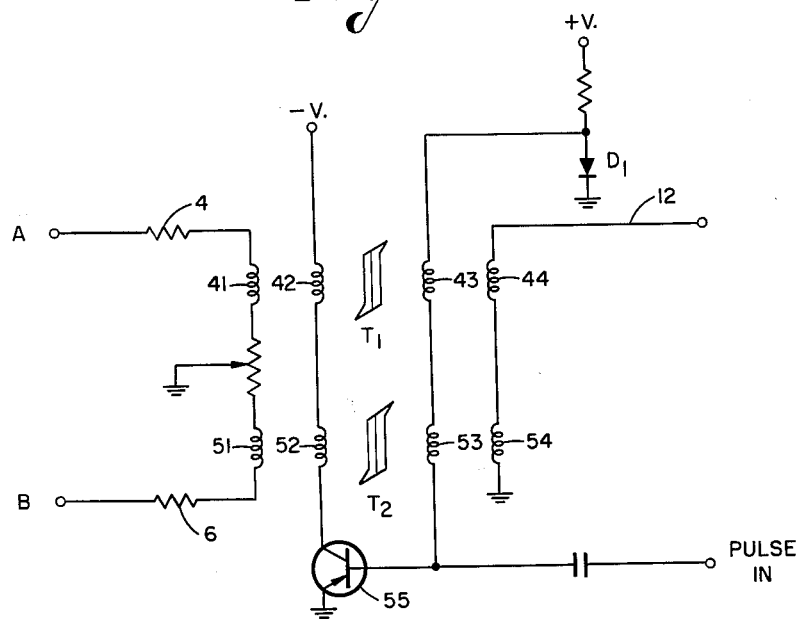

A still further alternative circuit embodying this invention is shown in FIG. 6, where the unknown voltage sources A and B establish averaged currents, respectively, through coils 41 and 51 of transformers with saturable cores. Unknown voltage sources A and B establish currents in windings 41 and 51 of saturable core transformers $T_1$ and $T_2$, establishing flux densities in the cores of $T_1$ and $T_2$ proportional to the volt-time average of the voltages at A and B. When the transistor switch 55 closes upon the arrival of an input pulse, the voltage $-V$ appears across windings 42 and 52 of $T_1$ and $T_2$ so as to induce an opposing flux in the cores of $T_1$ and $T_2$ which tends to drive them to saturation. At the same time, a voltage is induced in series-aiding windings 43 and 53 which tends to maintain the transistor switch in conduction until $T_1$ and $T_2$ saturate. In windings 44 and 54, similar voltages are induced, but the output tends to zero because of the series bucking connection. If the core flux levels of $T_1$ and $T_2$ differ just prior to the application of an input pulse, one core will saturate before the other during the discharge interval. Suppose the flux level of $T_2$ is greater than that of $T_1$. When $T_1$ saturates, most of the supply voltage $-V$ will appear across 52, the bucking voltage across $T_1$ output winding 44 will disappear, and a positive pulse will appear at the output until $T_2$ saturates. Conversely, if the flux level of $T_1$ had been greater than that of $T_2$, negative pulse would appear at the output. If the volt-time average of the unknown voltages A and B are equal over the interval between sampling pulses, no output will appear. A balancing potentiometer is provided in the input circuits to compensate for unbalance in the integrating circuits.

When both $T_1$ and $T_2$ have reached saturation after the application of an input pulse, the sustaining voltage provided by the series-aiding connection of 43 and 53 disappears, and the transistor switch returns to its nonconducting state. Cutoff bias is provided by the voltage drop across forward biased diode $D_1$.

Many modifications may be made in the integrating and sampling circuits of this invention without departing from the scope of the invention. Accordingly the foregoing description should be taken as illustrative and not in any limiting sense.

What is claimed is:

1. A comparator system for deriving an output pulse indicative of the relative values of first and second signal voltages over a given period of time, said system comprising:
   (a) means for storing energy corresponding in value respectively to the average values of said first and second voltages,
   (b) a load impedance,
   (c) pulse operated switch means coupled to said storing means and to said load, and when operated by a pulse defining discharge paths from said storing means through said switch means and said load which are in bucking relationship in said load for providing an output pulse which is a function of the algebraic combination of the energy stored in said storing means,
   (d) a source of pulses which are repetitive each said given period of time coupled to said switch means for providing said pulse which operates said switch means, and
   (e) means coupled to said load impedance for deriving said output pulse which is also indicative of which of said first and second voltages is of greater average value in accordance with the polarity of said pulse.

2. A comparator system for comparing the average voltage level of two signal voltages of irregular wave shape which arrive respectively from a first source of signal voltage and from a second source of signal voltage, a first integrating circuit and a second integrating circuit, a coupling transformer, the primary winding of said transformer being center tapped and having first and second winding sections on opposite sides of the center tap thereof, said first source, said first integrating circuit and said first winding section being connected in series with each other to provide a first series circuit, said second source, said second integrating circuit and said winding section being connected in series to each other to provide a second series circuit, switch means connected between said first integrating circuit and said center tap and between said second integrating circuit and said center tap for simultaneously discharging said integrating circuits into said primary winding to set up opposing fields in said transformer and to induce a voltage in the secondary winding of said transformer proportional to the difference in the energy stored in said integrating circuits.

3. A system for integrating, sampling and comparing two signal voltages, said system comprising:
   (a) first and second integrating circuits respectively including first and second storage condensers,
   (b) means for applying said voltages individually to said first and second integrating circuits,
   (c) a tapped impedance element coupled at the opposite ends thereof to said first and said second condensers whereby to establish opposing electric fields in said element,
   (d) switch means connected between said first condenser at the end thereof opposite to the impedance element connected end thereof and the tap on said impedance element, said switch means also being connected between said second condenser at the end thereof opposite to the impedance connected element thereof and said impedance element tap, said switch means being operative for simultaneously discharging said first and second condensers through said impedance element and through said switch means, and (e) an output circuit coupled across said impedance element for producing a voltage pulse of an amplitude and polarity indicative of the relative integrated values of said two signal voltages.

4. A comparator system for comparing the average voltage level of two signal voltages of irregular wave shape, said system comprising first and second integrating circuits each having an input, each integrating circuit including a separate storage condenser; an output transformer, said transformer having a primary winding with a center tap, said winding being connected in series between said first integrating circuit condenser and said second integrating circuit condenser, said center tap being connected to reference ground, means for applying a first of said signal voltages between the input to said first integrating circuit and said ground, means for applying the second of said signal voltages between the input to said second integrating circuit and said ground, a first switch circuit connected between said first integrating circuit condenser at the end thereof opposite to the winding connected end thereof and said ground, a second switch circuit connected between said second integrating circuit condenser at the end thereof opposite to said winding connected end thereof and said ground, and means for simultaneously closing the switch circuits for discharging said condensers through said primary winding to produce simultaneously opposing electric fields, and an output circuit coupled to said winding for producing a pulse of a polarity indicative of the relative average amplitudes of said signal voltages.

5. A system for comparing two voltages for deriving an output signal pulse having an amplitude and polarity indicative of the relative amplitudes of said voltages, said system comprising:

(a) first and second storage condenser,
(b) a pair of resistors connected in series between said condensers,
(c) means for applying said first voltage between the junction of said resistors and the terminal of said first condenser which is spaced from the terminal thereof connected to said resistors,
(d) means for applying said second voltage between the junction of said resistors and the terminal of said second condenser opposite to the terminal thereof connected to said resistors,
(e) first switch means for providing a first independent discharge circuit through a first of said pair of resistors,
(f) second switch means for providing a second independent discharge circuit for said second condenser through a second of said pair of resistors,
(g) means for simultaneously closing said switch means for discharging said condensers, and
(h) an output circuit connected across the terminals of said condensers which are connected to said resistors for generating said output signal pulse.

6. A system for comparing first and second voltages comprising:

(a) first and second transformers, each having a first, a second and a third winding and each having a saturable core,
(b) means for connecting said first windings of said first and second transformers in series with each other,
(c) means for applying said first and second voltages, respectively across said first winding of said first transformer and said first winding of said second transformer,
(d) a signal operated switching device, said second windings of said first and second transformers and a source of biasing voltage connected in series with each other,
(e) means for connecting said third windings of said first and second transformers in series bucking relationship with each other, and
(f) a source of pulses repetitive at a given rate for operating said switching device.

References Cited by the Examiner

UNITED STATES PATENTS

| | | | |
|---|---|---|---|
| 2,458,599 | 1/49 | Hussey | 328—151 |
| 2,841,707 | 7/58 | McCulley | 328—134 |
| 2,940,042 | 6/60 | Fisher | 328—110 X |
| 3,092,735 | 6/63 | Ricketts. | |

ROY LAKE, *Primary Examiner.*

NATHAN KAUFMAN, *Examiner.*